United States Patent Office 3,358,937
Patented Dec. 19, 1967

3,358,937
DRY GRINDING OF ALUMINA
Alan Pearson, Brentwood, Mo., and George MacZura, East St. Louis, Ill., assignors to Aluminum Company of America, Pittsburgh, Pa., a corporation of Pennsylvania
No Drawing. Filed Nov. 10, 1965, Ser. No. 507,218
1 Claim. (Cl. 241—15)

This invention relates to the grinding of alumina particles to smaller size by dry ball-milling.

Finely divided alumina is used for making ceramic articles by procedures which involve forming a molded body of the alumina and subsequently sintering the molded body. It is well known to produce the finely divided alumina by dry ball-milling a mass of alumina particles for sufficient time to break down the particles to the desired size. It is also known that—other conditions being equal—fired density of molded ceramic bodies increases with completeness of grinding; thus fired density is used herein to indicate the degree of grinding achieved. As used herein, the expression "ball-milling" refers to grinding in a rotating drum by means of abrasive balls, rods or the like.

In the dry ball-milling of alumina particles, some of the alumina tends to pack on the walls of the rotating drum and on the grinding media, which condition impairs the efficiency and effectiveness of the grinding operation, and also results in the presence of unground particles of alumina which adversely lower the "green" and fired density of the molded ceramic bodies made from the alumina and increase the amount of shrinkage which occurs during sintering.

It is the object of this invention to improve the dry ball-milling of alumina particles by addition to the alumina of a material which minimizes packing during the milling operation, increases grinding efficiency, and is not detrimental in subsequent use of the alumina in making molded ceramic bodies.

We have found that mixing a small amount of ethyl alcohol, methyl alcohol, isopropyl alcohol, n-propyl alcohol, n-octyl alcohol, ethylene glycol, triethylene glycol, ethylene glycol monoethyl ether, 1-amino-2-propanol, monoethanolamine, or triethanolamine with alumina to be ball-milled minimizes packing and thereby improves grinding of the alumina during the ball-milling operation. One or more of the aforesaid additives may be mixed with the alumina prior to, or during, ball-milling.

The amount of additive to be used may be as small as 0.05% by weight of the mixture, but we generally prefer to use about 0.5%. Higher percentages of the additive may be used but do not ordinarily produce further advantages than can be obtained with 0.5%.

The additives mentioned above are readily wettable by water and do not cause foaming in contact with water. Both of those characteristics are advantageous, for alumina for ceramic use is sometimes mixed with water for various reasons.

The advantages of using the above-mentioned additives during ball-milling of alumina for ceramic use are demonstrated by the following examples:

Example 1

Individual charges of equal volumes of Bayer process alpha alumina particles (2.5 microns median crystal size) taken from the same batch were dry ball-milled in a rotating drum for 16 hours, using alumina balls as the grinding media. Identical conditions of operation were employed in each case, except that in each instance but one an alcohol additive was mixed with the alumina prior to the ball-milling operation in an amount equal to 0.5% by weight of the alumina. During ball-milling of the charge to which no alcohol was added, considerable alumina packed hard on the wall of the drum and on the grinding balls, whereas such packing of alumina did not occur during grinding of the charges to which an alcohol had been added.

Alumina from each of the ground charges was poured into a mold where it was subjected to a pressure of 5,000 p.s.i. The molded body was next heated (fired) for one hour at 1700° C. The density of the pressed and fired body was measured, and the percentage of linear shrinkage of the molded body during the firing step was also determined. The data obtained are shown in Table I.

TABLE I

| Charge No. | Additive | Density (g./ml.) Pressed | Density (g./ml.) Fired | Percent Shrinkage |
|---|---|---|---|---|
| 1 | None | 2.47 | 3.871 | 13.92 |
| 2 | Ethylene glycol | 2.57 | 3.893 | 12.90 |
| 3 | Methyl alcohol | 2.51 | 3.889 | 13.56 |
| 4 | Ethyl alcohol | 2.51 | 3.884 | 13.55 |
| 5 | Isopropyl alcohol | 2.51 | 3.880 | 13.50 |
| 6 | Triethanolamine | 2.60 | 3.887 | 12.51 |
| 7 | Phenol | 2.58 | 3.885 | 12.76 |

Example 2

Ten individual charges of equal volume of Bayer process alumina particles taken from the same batch were dry ball-milled in a rotating drum for 8 hours, with alumina balls as the grinding media. Conditions of operation were identical in each case, except that—as indicated in Table II below—an alcohol was mixed with each charge but one in an amount equal to 0.5% (by weight) of the alumina. During ball-milling of the charge which contained no alcohol additive, a substantial portion of the alumina became packed hard on the wall of the drum and on the grinding balls, whereas hard packing did not occur during grinding of the charges containing the various alcohol additives.

Following the above-mentioned grinding, each of the charges of ground alumina was molded and pressed as described in Example 1, and the molded body was fired at 1650° C. for 1 hour. The density of the pressed and fired bodies, and the percentage of shrinkage in length during firing, were determined, the resultant data being set forth in the following table:

TABLE II

| Charge No. | Additive | Density (g./ml.) Pressed | Density (g./ml.) Fired | Percent Shrinkage |
|---|---|---|---|---|
| 1 | None | 2.44 | 3.763 | 13.49 |
| 2 | Ethylene glycol | 2.53 | 3.816 | 12.85 |
| 3 | Isopropyl alcohol | 2.47 | 3.790 | 13.27 |
| 4 | N-propyl alcohol | 2.48 | 3.795 | 13.20 |
| 5 | Ethylene glycol monoethyl ether | 2.53 | 3.831 | 12.95 |
| 6 | Monoethanolamine | 2.52 | 3.804 | 12.76 |
| 7 | 1-amino-2-propanol | 2.54 | 3.821 | 12.66 |
| 8 | N-octyl alcohol | 2.53 | 3.837 | 12.98 |
| 9 | Triethanolamine | 2.56 | 3.824 | 12.47 |
| 10 | Triethylene glycol | 2.53 | 3.816 | 12.87 |

We claim:
The method of producing finely divided alumina particles comprising preparing a mixture composed of alumina particles and at least one alcohol selected from the group composed of ethyl alcohol, methyl alcohol, isopropyl alcohol, n-propyl alcohol, n-octyl alcohol, ethylene glycol, triethylene glycol, ethylene glycol monoethyl ether,

1-amino-2-propanol, monoethanolamine, and triethanolamine in an amount equal to at least 0.05% by weight of the alumina, and dry ball-milling the said mixture.

References Cited

UNITED STATES PATENTS 3,068,110  12/1962  Fagerholt _____ 241—15 X

OTHER REFERENCES

Article: "Grinding Low-Soda Alumina," by Hart and Hudson, in Ceramic Bulletin, vol. 43, No. 1, pages 13–17 (1964).

WILLIAM W. DYER, JR., *Primary Examiner.*

W. D. BRAY, *Assistant Examiner.*